United States Patent [19]
Merkel et al.

[11] Patent Number: 5,258,150
[45] Date of Patent: Nov. 2, 1993

[54] FABRICATION OF LOW THERMAL EXPANSION, HIGH POROSITY CORDIERITE BODY

[75] Inventors: Gregory A. Merkel, Big Flats; Martin J. Murtagh, Trumansburg, both of N.Y.

[73] Assignee: Corning Incorporated, Corning, N.Y.

[21] Appl. No.: 802,877

[22] Filed: Dec. 6, 1991

[51] Int. Cl.$^5$ .............................................. B29C 65/00
[52] U.S. Cl. ........................................ 264/43; 264/44; 264/66; 264/177.12
[58] Field of Search ................... 264/42, 43, 44, 66, 264/177.12

[56] References Cited

U.S. PATENT DOCUMENTS 3,885,977  5/1975  Lachman et al. ............... 428/116 X
4,869,944  9/1989  Harada et al. ...................... 428/116

FOREIGN PATENT DOCUMENTS 0354721  2/1989  European Pat. Off.

Primary Examiner—Jan H. Silbaugh
Assistant Examiner—Christopher A. Fiorilla
Attorney, Agent, or Firm—L. Rita Quatrini

[57] ABSTRACT

A body is made up of at least about 93% by weight cordierite, having a coefficient of thermal expansion of no greater than about $4 \times 10^{-7} \, °C^{-1}$, from about 25° C. to about 800°0 C., and a total porosity of greater than about 42%. A method for producing the body which includes selecting raw materials to form a composition which forms cordierite on firing, the raw materials being composed of: talc having a BET surface area of no greater than about 5 m$^2$/g, 0 to about 48% by weight of clay, which can be platelet clay, stacked clay which can be delaminated into platelets during processing, and mixtures thereof, an aluminum oxide yielding component having an average particle size of either about 3 to about 8 micrometers in diameter, or no greater than about 3 micrometers in diameter, and free silica, intimately blending the raw materials with an effective amount of vehicle and forming aids to impart plastic formability and green strength to the raw materials and to form a plastic mixture therefrom. If the particle size of the aluminum oxide yielding component is no greater than about 3 micrometers in diameter, the raw materials are blended additionally with a burnout agent. The raw materials are formed into a green body which is dried and fired at a sufficient temperature for a sufficient time to form the cordierite body.

32 Claims, 2 Drawing Sheets

FABRICATION OF LOW THERMAL EXPANSION, HIGH POROSITY CORDIERITE BODY

BACKGROUND OF THE INVENTION

This invention relates to a cordierite body of low thermal expansion and high porosity. The invention relates to a method of making the body which makes use of a raw material composition of coarse talc in combination with silica, an alumina yielding component, and optionally, clay. More particularly, the body is formed by extrusion. Still more particularly, the body has a honeycomb structure.

Cordierite bodies having honeycomb structures are especially suited for but not limited to use as diesel particulate filters and as substrates for catalysts and catalyst supports in converting automotive exhaust.

Honeycombs, especially extruded honeycombs, find use in a number of applications, such as diesel particulate filters, as substrates for catalytically active components, as substrates for catalytic converters for automobiles, etc. Use of cordierite is favorable in these applications because of its good thermal shock resistance. The thermal shock resistance is inversely proportional to the coefficient of thermal expansion (CTE). That is, honeycombs with low thermal expansion have good thermal shock resistance and can survive the wide temperature fluctuations that are encountered in the application.

In these particular applications, in addition to low thermal expansion, a high porosity is desirable. When the body is used as a diesel particulate filter, a high volume fraction of interconnected porosity enhances the filtration capacity of the filter. When the body is used as a substrate for catalysts in a catalytic converter, a high porosity affords area for better adherence of high surface area washcoats which support the catalysts.

The following patents each relate to ceramic honeycombs having relatively low CTE's and various ranges of and types of porosity.

U.S. Pat. No. 4,869,944 relates to a cordierite honeycomb structural body to be used as a catalyst carrier having a low expansion ($\leq 3 \times 10^{-7}$ °C.$^{-1}$ from 40° to 800° C.) with limited porosity in the range of $\geq 30\%$ and $<42\%$.

European Patent Publication No. 0 354 721 relates to a porous ceramic honeycomb filter used as a diesel particulate filter. Cordierite is given as the the main component. The porosity is $>42\%$. The thermal expansions are reported to be $\geq 7 \times 10^{-7}$ °C.$^{-1}$ from 40° to 800° C.

U.S. Pat. No. 3,885,977 relates to an extruded honeycomb monolithic fired ceramic whose primary crystalline phase is cordierite and whose microstructure is characterized by a greater than random orientation of the anisotropic cordierite crystallites with their low thermal expansion direction aligned substantially parallel to the plane of the webs of the monolith. The axial expansion coefficient of the honeycomb with the composition near that of stoichiometric cordierite may be as low as $5.5 \times 10^{-7}$ °C.$^{-1}$ or lower in the range of 25°-1000° C. Porosity values are not disclosed.

It would be desirable and an advancement in the art to be able to produce a cordierite body which has a lower thermal expansion than has been set forth by the prior patents and at the same time has a high porosity.

SUMMARY OF THE INVENTION

In accordance with one aspect of the invention, there is provided a body of at least about 93% by weight cordierite, having a coefficient of thermal expansion of no greater than about $4 \times 10^{-7}$ °C.$^{-1}$, from about 25° C. to about 800° C., and a total porosity of greater than about 42%.

In accordance with another aspect of the invention, there is provided a method for producing the above described body which comprises selecting raw materials to form a composition which forms cordierite on firing, the raw materials being composed of: talc having a BET surface area of no greater than about 5 m$^2$/g, 0 to about 48% by weight of clay, which can be platelet clay, stacked clay which can be delaminated into platelets during processing, and mixtures thereof, an aluminum oxide yielding component having an average particle size of either about 3 to about 8 micrometers in diameter, or no greater than about 3 micrometers in diameter, and free silica, intimately blending the raw materials with an effective amount of vehicle and forming aids to impart plastic formability and green strength to the raw materials and form a plastic mixture therefrom. If the particle size of the aluminum oxide yielding component is no greater than about 3 micrometers in diameter, the raw materials are blended additionally with a burnout agent. The raw materials are formed into a green body which is dried and fired at a sufficient temperature for a sufficient time to form the cordierite body.

DETAILED DESCRIPTION OF THE INVENTION

Figure 1:
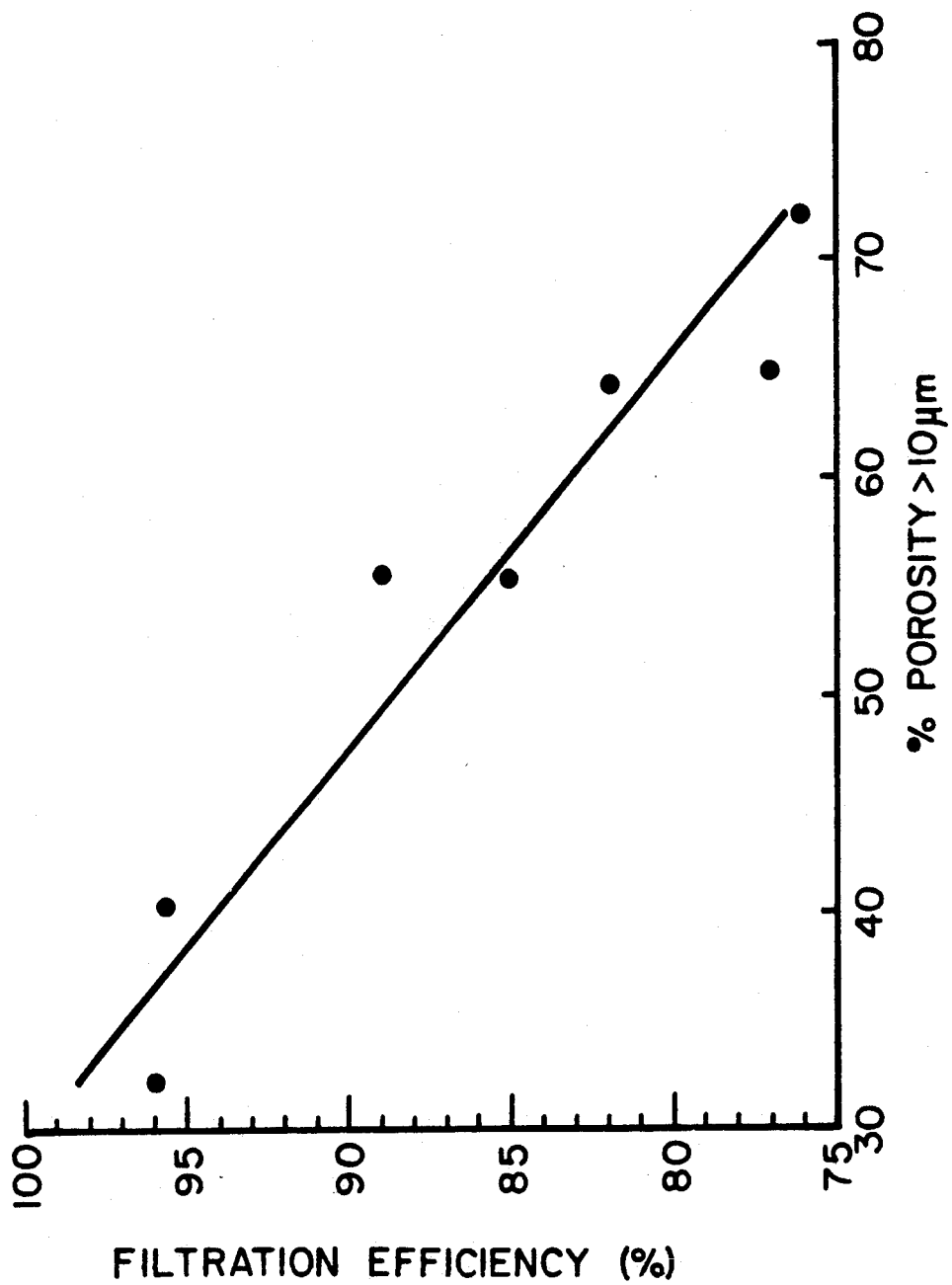
FIG. 1 is a plot of % filtration efficiency versus % porosity $>10$ micrometers for bodies of the present invention as used as diesel particulate filters.

This invention relates to a cordierite body of low thermal expansion and high porosity and to the method of making the body. The low thermal expansion enhances the life of the body through repeated very high-very low temperature fluctuatons that may be encountered in the application. The body is especially suited for, although not limited to, use as a diesel particulate filter. In this application, the high porosity allows for increased filtering capacity. Moreover, various combinations of pore sizes can be attained in the high porosity body while the very low CTE is maintained. Thus, the body can be made to suit a variety of applications, e.g., a variety of filtering applications. In accordance with another contemplated use, the relatively high porosity allows a higher surface area for increased loading of catalytic components when the body is used as a catalytic converter, or for better coatability for other end use applications.

DESCRIPTION OF THE RAW MATERIALS AND COMPOSITION

The raw materials are selected to form a composition of MgO, Al$_2$O$_3$, and SiO$_2$ which will form cordierite on firing. The composition preferably consists essentially of nominally, in percent by weight about 12 to about 16 magnesium oxide, about 33 to about 38 aluminum oxide, and about 49 to about 54 silica. The most preferred composition consists essentially of nominally in percent by weight about 12.5 to about 15.5 magnesium oxide, about 33.5 to about 37.5 aluminum oxide, and about 49.5 to about 53.5 silica.

Although the composition is relatively pure, some allowance is made for impurities. Impurities within the cordierite body are of concern since these can affect properties such as increasing CTE. Typically cordierite bodies are affected by impurities such as CaO, $K_2O$, $Na_2O$, $Fe_2O_3$, etc. It is desirable that the sum of the CaO, $K_2O$, and $Na_2O$ content be no greater than about 0.15% by weight based on the total raw materials.

THE TYPE OF TALC

One of the critical features of the present invention is the form of talc. All or part of the talc can be calcined.

The talc is provided in the form of coarse talc. By coarse talc is meant that it must have a BET surface area of no greater than about 5 $m^2/g$, and preferably no greater than about 3 $m^2/g$. It is preferred that the talc be platy. By platy talc is meant a platelet particle morphology, that is, the particles have two long dimensions and one short dimension, or, the length and width of the platelet are much larger than its thickness. It is preferred that the talc have a morphology index of no less than about 0.80. The morphology index is a measure of the degree of platiness of the talc. One typical procedure for measuring the morphology index is to place the talc sample in a holder so that the orientation of the platy talc is maximized within the plane of the sample holder. The x-ray diffraction pattern is then determined for this oriented talc. The morphology index semiquantitatively relates the platy character of the talc to its XRD peak intensities using the following equation:

$$M = I_x(I_x + 2I_y)^{-1}$$

where $I_x$ is the intensity of the (004) peak and $I_y$ is that of the (020) reflection [overlapped with the (111−) and (110)]. It is also preferred that the quotient of the talc mass percent <2 micrometers in diameter/the talc morphology index be no greater than about 30 and preferably no greater than about 20. Calcium is normally present as an impurity in talc. In accordance with the present invention, CaO is preferably no greater than about 0.3% and most preferably no greater than about 0.15% by weight in the talc.

THE TYPE OF CLAY

In accordance with the present invention, clay can be present as part of the raw material composition. When clay is present, it makes up no greater than about 48% and preferably no greater than about 20% by weight of the raw material composition. When clay is used as a raw material, it must have specific properties in order to attain the low CTE-high porosity combination in the body. The clay is provided in the form of a platelet clay which has platelet dimensions as described above for the talc, or stacked clay which can be delaminated into platelets during processing, or mixtures thereof. The mineral kaolinite occurs in "stacks" of platelets with one platelet stacked on top of others like slices in a loaf of bread. The stack of platelets forms a rod shaped grouping within the length of the stack substantially larger than the diameter. These kaolin stacks are then broken apart (delaminated) by mechanical processing and the individual platelets are separated. Now each platelet has a diameter (or length and width) significantly larger, e.g., ten times larger than its thickness. It is preferred that the BET surface area of the clay be no less than about 7 $m^2/g$, and most preferably no less than about 10 $m^2/g$ based on clay in the uncalcined state. This means that if clay is to be calcined prior to use in the raw material composition of the present invention, the BET surface area before calcining must be preferably no less than about 7 $m^2/g$ and most preferably no less than about 10 $m^2/g$. The preferred types of clay are kaolin, calcined clay and combinations of these. If calcined clay is used as part or all of the clay component, the weight percent mullite in the calcined clay is no less than about 2% of the total mass of the calcined clay. The weight percent mullite that can potentially form after complete recrystallization of the clay by prolonged calcination at high temperatures is about 65% of the mass of the calcined clay.

THE TYPE OF ALUMINUM OXIDE YIELDING COMPONENT

The aluminum oxide yielding component can be aluminum oxide per se, or any material that when fired forms aluminum oxide. The aluminum oxide yielding component must be of fine particle size in order for the low CTE to be attained in the body. The average particle size of the aluminum oxide yielding component is no greater than about 8 micrometers in diameter. The aluminum oxide yielding component can have an average particle size of either from about 3 to about 8 micrometers in diameter, or no greater than about 3 micrometers in diameter. When the average particle size of the aluminum oxide yielding component is no greater than about 3 micrometers in diameter, the addition of a burnout agent is necessary to maintain a total porosity of greater than about 42% by volume. Some preferred aluminum oxide yielding components that are especially suited to the practice of the present invention are aluminum oxide, aluminum hydroxide, aluminum oxyhydrate, and combinations of these. It is preferred to have aluminum hydroxide at a level of no less than about 1% by weight and most preferably no less than about 5% by weight of the raw materials. Some preferred aluminum oxide yielding components are alumina, and a combination of alumina and aluminum hydroxide. In these combinations and other combinations, the alumina is preferably alpha alumina.

THE TYPE OF FREE SILICA

The silica can be provided in any available form, e.g., crystalline, amorphous, etc.

The raw materials of the present invention result in the formation of cordierite in the subsequent firing step.

A burnout agent or agents can be added to enable further control of the porosity to desired levels as discussed previously. A burnout agent is any particulate substance (not a binder) that burns out of the green body in the firing step. When the aluminum oxide yielding component has a very fine particle size, that is, an average no greater than about 3 micrometers in diameter, a burnout agent is necessary to achieve a total porosity of greater than about 42% in the body. If the average particle size of the aluminum oxide yielding component is about 3 to about 8 micrometers in diameter, a burnout agent can be used to further increase the porosity. Some types of burnout agents that can be used, although it is to be understood that the invention is not limited to these are organics that are solid at room temperature, elemental carbon, combinations of these, etc., for example, graphite, cellulose, flour, etc. Elemental carbon is preferred. Graphite is especially preferred because it has the least adverse effect on the processing. In an extrusion process, for example, the rheology of the extrudable mixture is good when graphite is used. Graphite has a consistent particle size. Therefore consistent results as far as porosity can be attained. With graphite, the formed body dries without cracking. The BET surface area of the graphite is preferably no greater than about 5 m$^2$/g in order to maintain a high degree of orientation in the cordierite, and microcracking.

The above composition is then blended with a vehicle and forming aids which impart plastic formability and green strength to the raw materials when they are shaped into a body. When the forming is done by extrusion, the extrusion aids most typically used are methyl cellulose which serves as a binder, and a lubricant such as sodium stearate, although the invention is not limited to these.

The relative amounts of forming aids can vary depending on factors such as nature and amounts of raw materials used, etc. Typically, however, when methyl cellulose is used, it is present at a level of about 1% to about 6% as a super addition to the raw materials. Typically, when sodium stearate is used as the lubricant, it is present at a level of up to about 1% by weight as a super addition to the raw materials. Some especially preferred vehicle/forming aid combinations will be described in the examples that follow.

In accordance with a preferred embodiment, for an extrusion process, the raw material composition and extrusion aids are mixed together in dry form and then mixed with water as the vehicle. The amount of water can vary from one batch of materials to another and therefore is determined by pretesting the particular batch for extrudability.

The raw materials in the resulting plastic mixture are then formed into a green body. Articles which are unsintered are referred to as green bodies. Extrusion techniques are well known in the art. Some examples of preferred techniques will be given in the examples that follow for fabrication of the preferred types of bodies.

The invention is not limited to shape and size of the body. The body can have any shape and size depending on the application. One preferred structure is a honeycomb structure. Some examples of honeycomb structures, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Honeycombs having about 15 to about 30 cells/cm$^2$, (about 100 to about 200 cells/in$^2$) and about 0.30 to about 0.64 mm (about 12 to about 25 mil) wall thicknesses are especially suited for diesel particulate filter applications.

Once the green body is formed, it is dried at a temperature sufficient to remove any water or liquid phases that might be present.

It is then fired at a sufficient temperature for a sufficient time to form a cordierite body. The firing conditions can vary depending on the process conditions such as specific composition, size of the charge, and nature of the equipment. However, some preferred firing conditions are as follows:

heating the green body to a first temperature of about 1100° C. to about 1150° C., and thereafter from the first temperature to a second temperature of about 1300° C. to about 1350° C. at a firing rate of about 5° C. to about 100° C. per hour, and preferably about 20° C. to about 100° C. per hour, and thereafter to a third temperature of at least about 1390° C., most typically about 1390° C. to about 1430° C., and preferably about 1400° to about 1410° C. and holding at the third temperature for about 6 hours to about 16 hours.

The bodies of the present invention are at least about 93% by weight cordierite. Other phases such as for example, mullite, spinel, etc. can be present. However, these phases are present only to the extent that they do not raise the CTE of the body above about $4 \times 10^{-7}$ °C.$^{-1}$, from about 25° C. to about 800° C. (All CTE values are for 25° C. to 800° C.). Preferably, the bodies are at least about 97% by weight cordierite.

The cordierite bodies of the present invention are characterized by a low CTE, that is, a CTE of less than about $4 \times 10^{-7}$ °C.$^{-1}$ at 25° C. to 800° C. and most advantageously no greater than about $2 \times 10^{-7}$ °C.$^{-1}$ at 25° C. to 800° C. The bodies of the present invention are additionally characterized by a relatively high porosity, that is, a total porosity of greater than about 42% by volume. The upper limit of porosity is determined by practical considerations. However, the total porosity is most typically about 42% to about 60% by volume.

The bodies of the present invention most advantageously have a median pore diameter of about 5 to about 40 micrometers especially for diesel particulate filter applications.

Most advantageously, in about 30% to about 100% of the total porosity the pore diameter is greater than about 10 micrometers for diesel particuate filter applications.

The body, when formed as a honeycomb structure for example, by extrusion, is further characterized by the I ratio. The I ratio is represented by the formula:

$$I \text{ ratio} = \frac{I_{(110)}}{I_{(110)} + I_{(002)}}$$

where $I_{(110)}$ and $I_{(002)}$ are the peak heights of the reflections from the (110) and (002) planes respectively, based on hexagonal cordierite crystal structure. The axial and transverse I ratio refer to different orientations of a honeycomb sample in the x-ray beam. The x-ray beam impinges a planar surface at an angle. Measurements of the transverse I ratio are made when the planar surface of the sample is the flat surface made up of as formed wall surfaces of the honeycomb. Measurements of the axial I ratio are made off a plane which is perpendicular to the length of the cell channels (and, therefore, also perpendicular to that for a transverse I ratio) where the planar surface on which the x-rays impinge consists of the cross-sectional ends of the honeycomb webs. For a completely randomly oriented cordierite, the I ratio will be about 0.65. If the I ratio measured in the transverse direction with respect to the extrusion direction of the body exceeds 0.69 or the axial I ratio with respect to the extrusion direction is less than about 0.61, then the cordierite crystallites are becoming substantially oriented with respect to the plane of the webs. The bodies of the present invention typically have a transverse I ratio of greater than about 0.69, and an axial I ratio of less than about 0.61.

It is well established that the coefficient of thermal expansion of cordierite cellular bodies in the axial direction (parallel to the cell channels),$\alpha_{ax}$, is affected by non-random crystallographic orientation of the cordierite crystals in the microstructure, by the degree of microcracking present in the body after firing, and by the presence of high-expansion extraneous phases.

Specifically, a high volume fraction of cordierite crystals having their crystallographic z-axes oriented so as to lie near the plane of the cell walls (webs) reduces $\alpha_{ax}$ because the thermal expansion coefficient of cordierite is lowest (actually negative below about 1100° C.) along the direction of the z-axes. The degree of net preferred orientation of cordierite in the ceramic body is conventionally expressed by the value of the "transverse I-ratio," abbreviated "$I_t$." An increase in $I_t$ produces a decrease in $\alpha_{ax}$ due to a greater contribution of low-expansion z-axes to $\alpha_{ax}$ within the plane of the web.

Microcracking has also been shown to significantly reduce $\alpha_{ax}$ in cordierite ceramics. Microcracking occurs during cooling as a result of stresses generated throughout the microstructure due to the high anisotropy in the thermal expansion (contraction) coefficient of cordierite along its three crystallographic axes. It has been observed that the cordierite crystals exist in fan-like "domains" of radially aligned crystals. Cordierite crystals within a given domain are subparallel to one another, so that the entire domain exhibits the same high degree of thermal expansion (contraction) anisotropy as the cordierite crystals of which it is comprised.

Because the z-axes of cordierite crystals in one domain will typically be oriented in a different direction from the z-axes of the crystals in the adjacent domains, high thermal stresses are generated throughout the web during cooling, producing microcracks. Upon reheating, thermal expansion of the domains is partially accommodated by the re-closing of these cracks, so that the thermal expansion of the bulk ceramic is lower than would be the case in an unmicrocracked body. Furthermore, it has been shown that the degree to which microcracking lowers $\alpha_{ax}$ is proportional to the mean size of the domains that comprise the ceramic microstructure.

To more fully illustrate the invention, the following non-limiting examples are presented. All parts, portions, and percentages are by weight unless otherwise stated.

GENERAL PROCEDURE

The combinations of talc, calcined talc, kaolin, aluminum oxide, aluminum hydroxide, quartz, fused silica, graphite, and cellulose fiber shown in Tables 1 and 2 are blended together with about 2 to 4 parts of methyl cellulose and about 0.5 to about 0.75 parts of sodium stearate. The particle profiles of the raw materials are shown in Tables 3 and 4, and their chemistries are shown in Table 5.

Subsequently about 23 to 26 parts of deionized water are gradually added to each powder mixture in a muller. After kneading, the combined ingredients are transferred to a vacuum extruder and extruded through a die into 2.54 cm diameter honeycomb bodies having approximately 0.425 millimeter thick walls and approximately 15.5 square shaped cells (channels) per square centimeter. The bodies thus formed are cut into approximately 30 centimeter long samples and heated until dried.

After drying, the extruded honeycombs are cut into shorter lengths and heated over a 60 hour period to a temperature of about 1400° C. and held for about 7 hours. The fired honeycombs are then cut into smaller specimens for physical property measurement and characterization of secondary phases. The thermal expansion coefficient is measured along the direction parallel to the length of the open channels of the honeycomb, herein referred to as the axial direction. Thermal expansion coefficients reported in Tables 1 and 2 are the average values over the range 25° to 800° C. The transverse I ratio, $I_t$, is determined by x-ray diffractometry of the as-fired surfaces of the cell walls, as discussed previously. Volume percent porosity and median pore size are determined from mercury intrusion porosimetry. Quantitative measurement of the weight percent of mullite and spinel in the fired honeycombs is performed by powder x-ray diffractometry. The weight percent of cordierite is calculated by difference from 100 percent.

INVENTIVE EXAMPLES

Compositions A through N in Table 1 demonstrate cordierite ceramics according to the present invention in which thermal expansion coefficient is no greater than about $4 \times 10^{-7}$ °C.$^{-1}$ and volume percent porosity is greater than about 42%. The very low thermal expansion coefficients of $0.9 \times 10^{-7}$ °C.$^{-1}$ and $1.2 \times 10^{-7}$ °C.$^{-1}$ for compositions C and D demonstrate the further benefit of the very low calcium content of Talc 4 (Table 5).

Composition E demonstrates the further increase in percent porosity that is achieved by the super addition of 10 weight percent graphite to composition A.

Composition F shows that calcined talc can be present in the raw materials without adversely affecting the thermal expansion coefficient or porosity.

Compositions G through M demonstrate that a fine alumina powder can be utilized as a raw material, and, in such batches, the addition of a burnout agent is necessary in yielding at least about 42 volume percent porosity in the fired body.

Compositions G through L further show that a very coarse crystalline silica (Silica 2, Table 4) can be used as raw material without adversely affecting the thermal expansion coefficient. Also, compositions K and L demonstrate that chopped cellulose fiber can be utilized as a burnout agent to maintain a porosity greater than about 42 volume percent.

Finally, composition N demonstrates that thermal expansion coefficients no greater than about $4 \times 10^{-7}$ °C.$^{-1}$ are also attainable using coarser clay (Kaolin 2) as a raw material in place of finer clay (Kaolin 1). However, it is evident that the thermal expansion coefficient of the body made with the coarser clay is not as low as those of the bodies made with the finer clay. Therefore, a clay with a surface area greater than about 7 m$^2$/g is preferred.

In all of the inventive examples in Table 1, the cordierite transverse I-ratio ranges from about 0.87 to about 0.91, indicating a relatively high degree of preferred cordierite orientation with crystal z-axes preferentially oriented within the plane of the cell walls of the honeycomb ceramic. This high degree of orientation is attributed to the highly platy nature of the raw materials used in these examples.

COMPARATIVE EXAMPLES

Comparative examples of cordierite honeycomb ceramics having thermal expansion coefficients greater than about $4 \times 10^{-7}$ °C.$^{-1}$ are shown in Table 2. All of these samples are prepared according to the previously described general procedure.

Comparative compositions O through S demonstrate that the use of a talc raw material having a specific surface area in excess of 5 m²/g (Talc 1, Table 3) results in an increase in the thermal expansion coefficient to greater than about $5 \times 10^{-7}$ °C.$^{-1}$. Furthermore, the lower platiness of Talc 1, indicated by its lower Morphology Index (Table 3), produces a lower degree of preferred orientation of the

TABLE 1
COMPOSITIONS AND PHYSICAL PROPERTIES FOR LOW THERMAL EXPANSION COEFFICIENT INVENTIVE EXAMPLES.

| Batch Component Parts by Weight | A | B | C | D | E | F | G | H | I | J | K | L | M | N |
|---|---|---|---|---|---|---|---|---|---|---|---|---|---|---|
| Talc 1 | — | — | — | — | — | — | — | — | — | — | — | — | — | — |
| Talc 2 | 39.9 | — | — | — | 39.9 | 30.3 | 40.7 | 40.7 | 40.7 | 40.7 | 40.7 | 40.7 | 39.9 | 39.9 |
| Talc 3 | — | 39.9 | — | — | — | — | — | — | — | — | — | — | — | — |
| Talc 4 | — | — | 39.9 | 40.7 | — | — | — | — | — | — | — | — | — | — |
| Calcined Talc 2 | — | — | — | — | — | 9.9 | — | — | — | — | — | — | — | — |
| Kaolin 1 | 16.6 | 16.6 | 16.6 | 16.0 | 16.6 | 16.0 | 16.0 | 16.0 | 16.0 | 16.0 | 16.0 | 16.0 | 16.6 | — |
| Kaolin 2 | — | — | — | — | — | — | — | — | — | — | — | — | — | 16.6 |
| Alumina 1 | 15.0 | 15.0 | 15.0 | 14.8 | 15.0 | 14.8 | — | — | — | — | — | — | — | 15.0 |
| Alumina 2 | — | — | — | — | — | — | — | — | — | 14.8 | 14.8 | 14.8 | 15.0 | — |
| Alumina 3 | — | — | — | — | — | — | 14.8 | 14.8 | 14.8 | — | — | — | — | — |
| Aluminum Hydroxide 1 | 15.8 | 15.8 | 15.8 | 16.0 | 15.8 | 16.0 | 16.0 | 16.0 | 16.0 | 16.0 | 16.0 | 16.0 | 15.8 | 15.8 |
| Silica 1 | 12.7 | 12.7 | 12.7 | 12.5 | 12.7 | 12.5 | — | 6.3 | — | 6.3 | 6.3 | 6.3 | 12.7 | 12.7 |
| Silica 2 | — | — | — | — | — | — | 12.5 | 6.3 | 12.5 | 6.3 | 6.3 | 6.3 | — | — |
| Burnout 1 | — | — | — | — | — | — | 15.0 | — | — | — | — | — | — | — |
| Burnout 2 | — | — | — | — | 10.0 | — | — | 15.0 | 10.0 | — | 10.0 | 10.0 | 15.0 | 15.0 |
| Burnout 3 | — | — | — | — | — | — | — | — | — | 2.0 | 10.0 | — | — | — |
| Weight % MgO | 13.7 | 13.7 | 13.7 | 14.1 | 13.7 | 14.1 | 14.1 | 14.1 | 14.1 | 14.1 | 14.1 | 14.1 | 13.7 | 13.7 |
| Weight % Al₂O₃ | 35.7 | 35.7 | 35.7 | 35.6 | 35.7 | 35.6 | 35.6 | 35.6 | 35.6 | 35.6 | 35.6 | 35.6 | 35.7 | 35.7 |
| Weight % SiO₂ | 50.6 | 50.6 | 50.6 | 50.3 | 50.6 | 50.3 | 50.3 | 50.3 | 50.3 | 50.3 | 50.3 | 50.3 | 50.6 | 50.6 |
| Thermal Expansion Coefficient@ | 2.7 | 3.4 | 0.9 | 1.2 | 3.4 | 2.5 | 1.9 | 3.9 | 3.8 | 1.4 | 2.8 | 1.5 | 2.4 | 4.0 |
| Transverse I-ratio | 0.90 | 0.88 | 0.90 | 0.90 | 0.88 | 0.89 | 0.87 | 0.87 | n.d. | 0.89 | 0.90 | 0.88 | 0.90 | 0.91 |
| Volume % Porosity | 43.0 | 45.0 | 43.0 | 44.0 | 48.0 | 44.0 | 46.0 | 48.0 | 47.0 | 47.0 | 46.0 | 50.0 | 46.0 | 45.0 |
| Median Pore Size (μm) | 9.1 | 15.4 | 12.3 | 12.0 | 11.0 | 8.8 | 19.0 | 28.0 | 24.6 | 14.0 | 13.1 | 12.4 | 9.0 | 10.0 |
| % Porosity > 10 μm | 32.3 | 72.2 | 62.9 | 60.9 | 55.8 | 40.6 | 87.3 | 91.0 | 75.8 | 55.8 | 64.5 | 65.0 | 44.6 | 45.6 |
| Weight % cordierite | 96.7 | 96.9 | 97.5 | 98.6 | 96.3 | 98.0 | 98.5 | 99.0 | 98.0 | 97.8 | 98.0 | 98.7 | 98.2 | 96.7 |
| Weight % spinel | 2.6 | 2.0 | 1.6 | 1.4 | 2.8 | 2.0 | 1.5 | 1.0 | 2.0 | 1.7 | 2.0 | 1.3 | 1.8 | 2.4 |
| Weight % mullite | 0.7 | 1.1 | 0.9 | 0.0 | 0.9 | 0.0 | 0.0 | 0.0 | 0.0 | 0.5 | 0.0 | 0.0 | 0.0 | 0.9 |

— Not included
@$10^{-7}$· C.$^{-1}$ (25° C. to 800° C.)

TABLE 2
COMPOSITIONS AND PHYSICAL PROPERTIES FOR COMPARATIVE EXAMPLES.

| Batch Component Parts by Weight | O | P | Q | R | S | T | U* |
|---|---|---|---|---|---|---|---|
| Talc 1 | 39.9 | 39.9 | 39.9 | 39.9 | 39.9 | — | — |
| Talc 2 | — | — | — | — | — | 39.9 | 40.7 |
| Kaolin 1 | 16.6 | 16.6 | 16.6 | 16.6 | 16.6 | 16.6 | 16.0 |
| Kaolin 2 | — | — | — | — | — | — | — |
| Alumina 1 | 15.0 | 15.0 | 15.0 | 15.0 | 15.0 | 15.0 | — |
| Alumina 2 | — | — | — | — | — | 15.8 | — |
| Alumina 3 | — | — | — | — | — | — | 14.8 |
| Aluminum Hydroxide 1 | 15.8 | 15.8 | 15.8 | 15.8 | 15.8 | — | 16.0 |
| Silica 1 | 12.7 | 12.7 | — | — | 12.7 | — | — |
| Silica 2 | — | — | — | 12.7 | — | — | 12.5 |
| Silica 3 | — | — | 12.7 | — | — | — | — |
| Silica 4 | — | — | — | — | 12.7 | — | — |
| Burnout 1 | 15.0 | — | 15.0 | 15.0 | 15.0 | — | — |
| Burnout 2 | — | 15.0 | — | — | — | 15.0 | 10.0 |
| Weight % MgO | 13.7 | 13.7 | 13.7 | 13.7 | 13.7 | 12.9 | 14.1 |
| Weight % Al₂O₃ | 35.7 | 35.7 | 35.7 | 35.7 | 35.7 | 39.5 | 35.6 |
| Weight % SiO₂ | 50.6 | 50.6 | 50.6 | 50.6 | 50.6 | 47.7 | 50.3 |
| Thermal Expansion Coefficient@ | 6.1 | 7.4 | 5.1 | 7.0 | 6.2 | 7.0 | 7.3 |
| Transverse I-ratio | 0.84 | 0.84 | 0.87 | 0.85 | 0.81 | 0.89 | |
| Volume % Porosity | 50.0 | 50.0 | 49.0 | 50.0 | 48.0 | 46.0 | 47.0 |
| Median Pore Size (μm) | 15.0 | 12.0 | 21.0 | 31.0 | 11.0 | 8.0 | 22.0 |
| Weight % cordierite | 97.0 | 96.8 | 97.9 | 95.3 | 97.5 | 88.6 | 94.5 |
| Weight % spinel | 2.2 | 2.5 | 2.1 | 4.0 | 2.5 | 4.2 | 5.0 |
| Weight % mullite | 0.8 | 0.7 | 0.0 | 0.7 | 0.0 | 7.2 | 0.5 |

*Fired at 1385° C. for 7 hours
— Not included
@$10^{-7}$· C.$^{-1}$ (25° C. to 800° C.)

TABLE 3
PARTICLE PROFILES FOR SELECTED RAW MATERIALS

| RAW MATERIAL | % < 20μ | % < 10μ | % < 5μ | % < 2μ | MPS@ | SURFACE AREA* | MORPHOLOGY INDEX |
|---|---|---|---|---|---|---|---|
| Talc 1 | 81.5 | 66.0 | 51.0 | 30.0 | 5.0 | 6.8 | 0.65 |
| Talc 2 | 81.5 | 56.5 | 32.0 | 11.5 | 8.0 | 2.1 | 0.94 |
| Talc 3 | 71.0 | 50.0 | 32.5 | 14.5 | 10.0 | 2.2 | 0.95 |
| Talc 4 | 83.0 | 63.0 | 39.0 | 15.0 | 7.0 | 1.7 | 0.95 |
| Calcined Talc 2# | 84.0 | 55.0 | 30.0 | 8.0 | 9.0 | 1.2 | platy |
| Kaolin 1 | 100.0 | 100.0 | 100.0 | 86.0 | 1.0 | 14.0 | NA |
| Kaolin 2 | 95.0 | 75.0 | 41.0 | 8.0 | 8.0 | 7.0 | NA |
| Alumina 1 | 98.0 | 90.0 | 59.0 | 5.0 | 4.5 | 1.0 | NA |
| Alumina 2 | 100.0 | 100.0 | 98.0 | 96.0 | 0.5 | 10.0 | NA |
| Alumina 3 | 100.0 | 98.0 | 84.0 | 33.0 | 3.0 | 2.5 | NA |

TABLE 3-continued

PARTICLE PROFILES FOR SELECTED RAW MATERIALS

| RAW MATERIAL | % < 20μ | % < 10μ | % < 5μ | % < 2μ | MPS@ | SURFACE AREA* | MORPHOLOGY INDEX |
|---|---|---|---|---|---|---|---|
| Aluminum Hydroxide 1 | 100.0 | 100.0 | 85.0 | 23.5 | 3.0 | 3.7 | NA |

@MPS - Median particle size (μm) from Sedigraph analysis
*N$_2$ BET in units of m$^2$/g
NA Not applied
Calcined at 1200° C.

TABLE 4

PARTICLE PROFILES FOR SELECTED RAW MATERIALS (continued)

| RAW MATERIAL | PERCENT FINER THAN | | | SURFACE AREA* |
|---|---|---|---|---|
| | 90% | 50% | 10% | |
| Silica 1@ | 50 μm | 20 μm | 3 μm | 0.5 |
| Silica 2# | 170 μm | 100 μm | 50 μm | 0.3 |
| Silica 3@ | 107 μm | 46 μm | 8 μm | 0.6 |
| Silica 4@ | 23 μm | 7 μm | 1 μm | 5.0 |
| Burnout 1@ | 232 μm | 101 μm | 50 μm | 1.3 |
| Burnout 2@ | 84 μm | 39 μm | 8 μm | 4.3 |

*N$_2$ BET in units of m$^2$/g
@Microtrac - Leeds & Northrup.
Sieve analysis
Silicas 1,2, and 4 are alpha quartz.
Silica 3 is fused silica.

TABLE 5

CHEMISTRIES OF SELECTED RAW MATERIALS (IN WEIGHT PERCENTS)

| RAW MATERIAL | MgO | SiO$_2$ | Fe$_2$O$_3$ | CaO | Al$_2$O$_3$ | NiO | K$_2$O + Na$_2$O | F | LOI# |
|---|---|---|---|---|---|---|---|---|---|
| Talc 1 | 31.3 | 61.0 | 1.22 | 0.13 | 1.10 | * | 0.03 | 0.15 | 5.40 |
| Talc 2 | 30.4 | 61.6 | 1.72 | 0.14 | 0.12 | 0.50 | 0.08 | 0.01 | 5.31 |
| Talc 3 | 31.8 | 63.3 | 0.04 | 0.29 | 0.04 | * | 0.03 | 0.12 | 4.84 |
| Talc 4 | 30.3 | 62.8 | 3.00 | 0.07 | 0.12 | 0.30 | 0.02 | 0.15 | 4.94 |
| Calcined Talc 1 | 32.1 | 65.2 | 1.84 | 0.13 | 0.11 | 0.50 | 0.01 | * | 0.06 |
| Kaolin 1 | * | 45.1 | 0.34 | 0.02 | 38.5 | * | 0.15 | * | 14.2 |
| Kaolin 2 | 0.02 | 45.8 | 0.25 | 0.03 | 38.6 | * | 0.20 | * | 14.0 |
| Alumina 1 | * | 0.03 | * | * | 99.4 | * | 0.30 | * | 0.29 |
| Alumina 2 | * | 0.06 | * | * | 99.3 | * | 0.09 | * | 0.60 |
| Alumina 3 | * | 0.02 | 0.01 | * | 99.7 | * | 0.08 | * | 0.15 |
| Aluminum Hydroxide 1 | * | * | * | * | 65.0 | | 0.24 | * | 34.7 |
| Silica 1 | * | 99.8 | * | * | * | * | * | * | 0.21 |
| Silica 2 | * | 99.8 | * | * | * | * | * | * | 0.21 |
| Silica 3 | * | 99.8 | * | * | * | * | * | * | 0.05 |
| Silica 4 | * | 99.5 | * | * | * | * | * | * | 0.52 |
| Burnout 1 | * | * | * | * | * | * | * | * | 99.9 |
| Burnout 2 | * | * | * | * | * | * | * | * | 99.9 |
| Burnout 3 | * | * | * | * | * | * | * | * | 99.9 |

LOI - Lost on ignition at 1000° C.
*Not detected cordierite in the fired bodies, as indicated by the lower transverse I ratios of 0.81 to 0.87 for compositions O through S in Table 2.

Comparative composition T in Table 2 shows that the use of a coarse talc and fine clay is insufficient to ensure a thermal expansion coefficient less than about $4 \times 10^{-7}$ °C$^{-1}$ when the composition in terms of the weight percentages of anhydrous end member oxides lies outside the range of the invention such that an inordinate amount of secondary phases are present after firing.

Finally, comparative example U, made with the same raw materials as inventive composition I, but fired at only about 1385° C. for about 7 hours, demonstrates the need to fire the bodies at a sufficiently high temperature to ensure that the amount of unreacted intermediate reaction products, such as spinel, does not exceed the limits required to maintain the thermal expansion coefficient less than about $4 \times 10^{-7}$ °C$^{-1}$.

DIESEL PARTICULATE FILTER TESTING

Selected samples from Table 1 are plugged in alternating cells on one end and opposite alternating cells on the other end. The plugging compound utilized is a paste composed of pulverized, fired cordierite in an organic binder. Cells are plugged to a depth of 2.54 cm. The samples are then refired to about 1390° C. to cure the plugging "cement".

Figure 2:
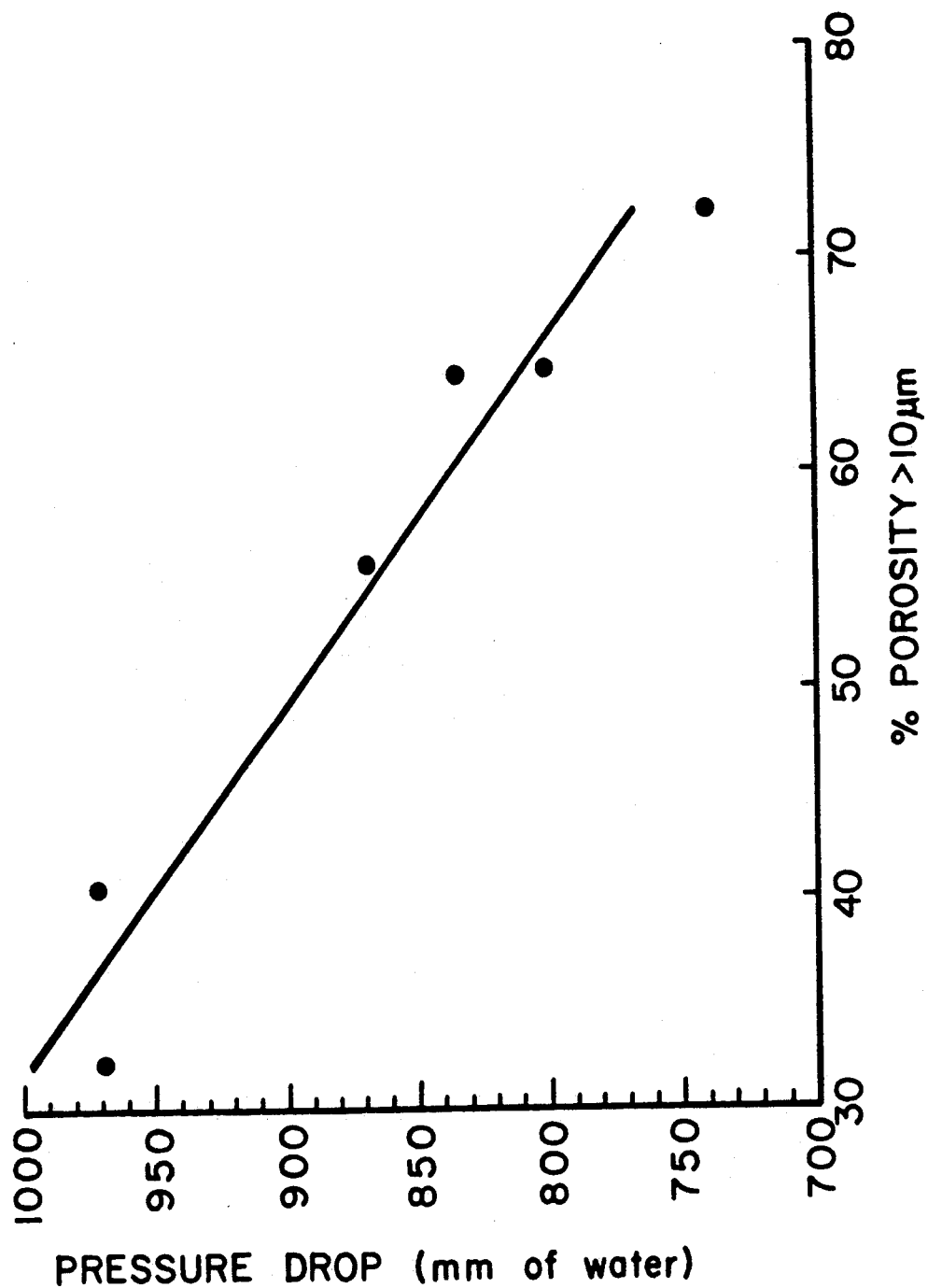
FIG. 2 is a plot of pressure drop versus % porosity $>10$ micrometers for bodies of the present invention as used as diesel particulate filters.

Samples are then tested on a diesel soot (aerosol) generator at a flow rate of about 0.6 m$^3$/minute. Efficiency at a soot average particle size range of about 0.3 to about 0.4 micrometers and pressure drop are determined, and are plotted against the volume percent porosity greater than about 10 micrometers in FIGS. 1 and 2 respectively. These data show that the inventive examples provide highly satisfactory filtration efficiencies of about 75% to about 95% at tolerable pressure drops of less than about 1000 mm of water, demonstrating that these materials are suitable for diesel particulate filter applications.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for producing a cordierite body, said method comprising:

a) selecting raw materials to form a composition which forms cordierite on firing, the composition consisting essentially of nominally in percent by weight about 12 to about 16 magnesium oxide, about 33 to about 38 aluminum oxide, and about 49 to about 54 silica, said raw materials being composed of:
  platy talc having a BET surface area of no greater than about 5 m$^2$/g,
  0 to about 48% by weight of clay, said clay being selected from the group consisting of platelet clay, stacked clay which can be delaminated into platelets during processing, and mixtures thereof,
  an aluminum oxide yielding component having an average particle size selected from the group consisting of about 3 to about 8 micrometers in diameter, and no greater than about 3 micrometers in diameter, and
  free crystalline silica;
b) intimately blending said raw materials with an effective amount of vehicle and forming aids to impart plastic formability and green strength to said raw materials and form a plastic mixture therefrom, and with a burnout agent when said average particle size of said aluminum oxide yielding component is no greater than about 3 micrometers in diameter;
c) forming said raw materials into a green body;
d) drying said green body; and
e) heating said green body to a first temperature of about 1100° C. to about 1150° C., and thereafter from said first temperature to a second temperature of about 1300° C. to about 1350° C. at a firing rate of about 5° C. per hour to about 100° C. per hour, and thereafter to a third temperature of at least about 1390° C. and holding at said third temperature for about 6 hours to about 16 hours, to form a cordierite body, wherein the cordierite body is at least about 93% by weight cordierite, said body having a coefficient of thermal expansion of no greater than about $4 \times 10^{-7}$ °C.$^{-1}$, from about 25° C. to about 800° C., a total porosity of greater than about 42% by volume, a median pore diameter of about 5 to about 40 micrometers, and a pore diameter of greater than about 10 micrometers in about 30% to about 100% of the total porosity of the body.

2. A method of claim 1 wherein the BET surface area of said talc is no greater than about 3 m$^2$/g.

3. A method of claim 1 wherein said talc has a morphology index of no less than about 0.80.

4. A method of claim 1 wherein the quotient of the talc mass percent <2 micrometers/the talc morphology index is no greater than about 30.

5. A method of claim 4 wherein said quotient is no greater than about 20.

6. A method of claim 1 wherein said talc has a CaO level of no greater than about 0.3% by weight.

7. A method of claim 6 wherein said CaO level is no greater than about 0.15% by weight.

8. A method of claim 1 wherein the BET surface area of said clay is no less than about 7 m$^2$/g based on said clay in the uncalcined state.

9. A method of claim 8 wherein said BET surface area of said clay is no less than about 10 m$^2$/g.

10. A method of claim 1 wherein said clay is selected from the group consisting of kaolin clay, calcined clay, and combinations thereof, wherein when calcined clay is used as at least part of said clay, the percent mullite present in said calcined clay is no less than about 2% by weight.

11. A method of claim 1 wherein said clay is present in said raw materials at no greater than about 20% by weight.

12. A method of claim 1 wherein said aluminum oxide yielding component is selected from the group consisting of aluminum oxide, aluminum hydroxide, aluminum oxyhydrate and combinations thereof.

13. A method of claim 12 wherein aluminum hydroxide makes up no less than about 1% by weight of said raw materials.

14. A method of claim 13 wherein said aluminum hydroxide makes up no less than about 5% by weight of said raw materials.

15. A method of claim 12 wherein said aluminum oxide yielding component is selected from the group consisting of alumina, and a combination of alumina and aluminum hydroxide.

16. A method of claim 15 wherein said alumina is alpha alumina.

17. A method of claim 1 wherein said composition consists essentially of nominally in percent by weight about 12.5 to about 15.5 magnesium oxide, about 33.5 to about 37.5 aluminum oxide, and about 49.5 to about 53.5 silica.

18. A method of claim 1 wherein said burnout agent is elemental carbon.

19. A method of claim 18 wherein said burnout agent is graphite.

20. A method of claim 19 wherein said graphite has a BET surface area of no greater than about 5 m$^2$/g.

21. A method of claim 1 wherein when said average particle size of said aluminum oxide yielding component is about 3 to about 8 micrometers in diameter, said raw materials are blended with a burnout agent prior to said forming step.

22. A method of claim 21 wherein said burnout agent is elemental carbon.

23. A method of claim 22 wherein said burnout agent is graphite.

24. A method of claim 23 wherein the BET surface area of said graphite is no greater than about 5 m$^2$/g.

25. A method of claim 1 wherein said forming is done by extruding said raw materials.

26. A method of claim 1 wherein said firing rate is about 20° C. per hour to about 60° C. per hour.

27. A method of claim 1 wherein said third temperature is about 1400° C. to about 1410° C.

28. A method of claim 1 wherein said coefficient of thermal expansion is no greater than about $2 \times 10^{-7}$ °C.$^{-1}$, from about 25° C. to about 800° C.

29. A method of claim 1 wherein said total porosity of said cordierite body is greater than about 42% to about 60%.

30. A method of claim 1 wherein said body has a honeycomb structure.

31. A method of claim 30 wherein the cells of the honeycomb are alternately plugged in the pattern of alternating cells on one end and opposite alternately cells on the other end.

32. A method of claim 1 wherein said body has a cordierite content of at least about 97% by weight.

* * * * *